(12) United States Patent
Nakajima

(10) Patent No.: US 11,072,207 B2
(45) Date of Patent: Jul. 27, 2021

(54) TIRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 241 days.

(21) Appl. No.: 16/275,517

(22) Filed: Feb. 14, 2019

(65) Prior Publication Data

US 2019/0263195 A1    Aug. 29, 2019

(30) Foreign Application Priority Data

Feb. 28, 2018 (JP) .............................. JP2018-034038

(51) Int. Cl.
*B60C 13/00* (2006.01)

(52) U.S. Cl.
CPC .................................. *B60C 13/001* (2013.01)

(58) Field of Classification Search
CPC .............................. B60C 13/001; B60C 13/02
See application file for complete search history.

(56) References Cited

U.S. PATENT DOCUMENTS

| | | | | |
|---|---|---|---|---|
| 4,198,774 A | * | 4/1980 | Roberts | B60C 13/001 152/523 |
| 5,263,525 A | * | 11/1993 | Yamashita | B60C 13/04 152/523 |
| 6,253,815 B1 | * | 7/2001 | Kemp | B44F 1/02 152/523 |
| 2006/0032569 A1 | * | 2/2006 | Zimmer | G09F 7/165 152/524 |
| 2012/0227879 A1 | * | 9/2012 | Muhlhoff | B23K 26/36 152/151 |
| 2018/0099530 A1 | * | 4/2018 | Yonetsu | B29D 30/72 |

FOREIGN PATENT DOCUMENTS

| | | |
|---|---|---|
| JP | 9-86106 A | 3/1997 |
| JP | 2003175707 A * | 6/2003 |

* cited by examiner

*Primary Examiner* — Jacob T Minskey
*Assistant Examiner* — Virak Nguon
(74) *Attorney, Agent, or Firm* — Greenblum & Bernstein, P.L.C.

(57) ABSTRACT

At least a part of a surface of at least one mark provided on a surface of a sidewall portion is provided with a serration portion in which a plurality of ridges is arranged in parallel. Each of the ridges has a triangular or trapezoidal cross section taken perpendicular to a length direction thereof having a first oblique side and a second oblique side, and an angle of the first oblique side with respect to a reference surface is different from an angle of the second oblique side with respect to the reference surface.

20 Claims, 5 Drawing Sheets

TIRE

TECHNICAL FIELD

The present invention relates to a tyre having improved legibility of a mark provided on a sidewall portion.

BACKGROUND ART

On a surface of at least one of the sidewall portions of the tyre, one or more marks which are letters, symbols, and the like indicating the manufacturer name, brand name, size, and the like of the tyre are formed. In order to improve the legibility of the marks, for example, it has been known that the marks are formed to be one step higher than the surface of the sidewall portion and a serrated pattern is formed by arranging a plurality of ridges in parallel on the surface of each of the marks (for example, see Japanese Unexamined Patent Application Publication No. H9-86106).

SUMMARY OF THE INVENTION

However, each of the ridges mentioned above has an isosceles triangle cross section in which slope angles of both sides are equal to each other, therefore, amount of light reflected by surfaces of the ridges is relatively small. Further, there is little change in contrast between when viewed from one side and when viewed from the other side, therefore, there is room for improvement in terms of the legibility.

An object of the present invention is to provide a tyre capable of improving the legibility by increasing the area of the slopes on one side to increase the amount of reflected light so as to bring about a big difference in contrast between one side and the other side.

In one aspect of the present invention, a tyre comprises a sidewall portion provided with a mark indicating portion having one or more marks, wherein the mark indicating portion comprises a reference surface provided on a surface of the sidewall portion and the one or more marks formed on the reference surface, at least a part of a surface of the or each mark is provided with a serration portion in which a plurality of ridges is arranged in parallel, each of the ridges has a triangular or trapezoidal cross section taken perpendicular to a length direction thereof having a first oblique side and a second oblique side, and an angle θ1 of the first oblique side with respect to the reference surface is different from an angle θ2 of the second oblique side with respect to the reference surface.

In another aspect of the invention, it is preferred that a difference |θ1−θ2| between the angle θ1 and the angle θ2 is not less than 10 degrees.

In another aspect of the invention, it is preferred that the or each mark is provided with an edging portion extending along an outer circumference of the or each mark to surround the serration portion thereof, and the edging portion has a height equal to or larger than that of the serration portion.

In another aspect of the invention, it is preferred that the edging portion is provided with a plurality of small protruding portions each protruding from a surface of the edging portion.

In another aspect of the invention, it is preferred that each of the small protruding portions is a truncated conical protrusion having a smaller diameter on a side of an upper end thereof.

In another aspect of the invention, it is preferred that each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

In another aspect of the invention, it is preferred that each of the small protruding portions is a rib-shaped protrusion having a trapezoidal cross section with a thickness thereof decreasing toward an upper end thereof, and the rib-shaped protrusions are arranged in parallel to each other or in a non-parallel manner.

In another aspect of the invention, it is preferred that each of the rib-shaped protrusions has a maximum thickness in a range of from 20 to 1000 micro meters and a protruding height in a range of from 200 to 500 micro meters, and a distance between the rib-shaped protrusions adjacent to each other is in a range of from 10 to 800 micro meters.

In another aspect of the invention, it is preferred that the surface of the or each mark is inclined with respect to the reference surface in a direction in which a height thereof increases from one side to the other side in a tyre circumferential direction.

In another aspect of the invention, it is preferred that in each of the ridges, a mildly sloped one of the first oblique side and the second oblique side is arranged on the one side in the tyre circumferential direction.

In another aspect of the invention, it is preferred that the mark indicating portion is provided with a base portion projecting from the surface of the sidewall portion at a constant height, and a surface of the base portion forms the reference surface.

In one aspect of the present invention, each of the ridges is formed to have a triangular or trapezoidal cross section in which the angle θ1 of the first oblique side and the angle θ2 of the second oblique side are different.

Thereby, an area of an inclined surface on one side (the inclined surface having the first oblique side, for example) of each of the ridges is relatively large, therefore, it is possible that an amount of reflected light is increased. Further, a difference between the amount of the reflected light of the inclined surface on the one side and the amount of the reflected light of the inclined surface on the other side becomes large, therefore, it is possible that a large difference in contrast is brought about between when viewed from one side and when viewed from the other side. And by a synergistic effect of these, it becomes possible that the legibility is improved.

DESCRIPTION OF THE PREFERRED EMBODIMENT

An embodiment of the present invention will now be described below in detail.

Figure 1:
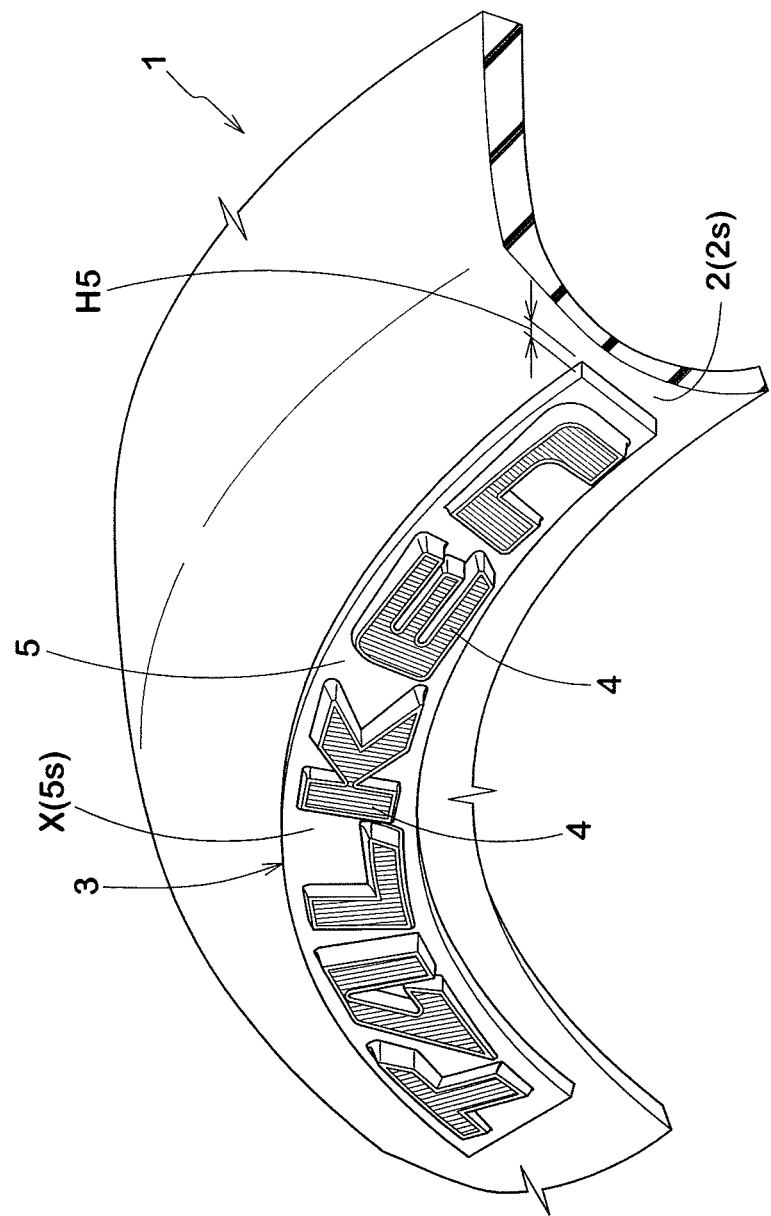
FIG. 1 is a partial perspective view of a tyre according to an embodiment of the present invention.

As shown in FIG. 1, a tyre 1 in this embodiment is provided with one or more mark indicating portions 3 in at least one of sidewall portions 2. Each of the mark indicating portions 3 is provided with a reference surface (x) provided on a surface (2s) of a respective one of the sidewall portions 2 and one or more marks 4 formed on the reference surface (x). In this embodiment, each of the mark indicating portions 3 is provided with a base portion 5 which projects stepwise from the surface (2s) of a respective one of the sidewall portions 2 at a constant height (H5) (that is, a top surface of the base portion is not inclined with respect to the surface (2s)) and a surface (5s) of the base portion 5 forms the reference surface (x).

Each of the marks 4 is a letter, a symbol, a figure, and the like for representing the manufacturer name, brand name, size, and the like of the tyre, and in this embodiment, a case is shown in which a brand name consisting of a plurality of the marks 4 is formed on the reference surface (x). The marks 4 are protruded from the reference surface (x) at a small height.

Figure 2:
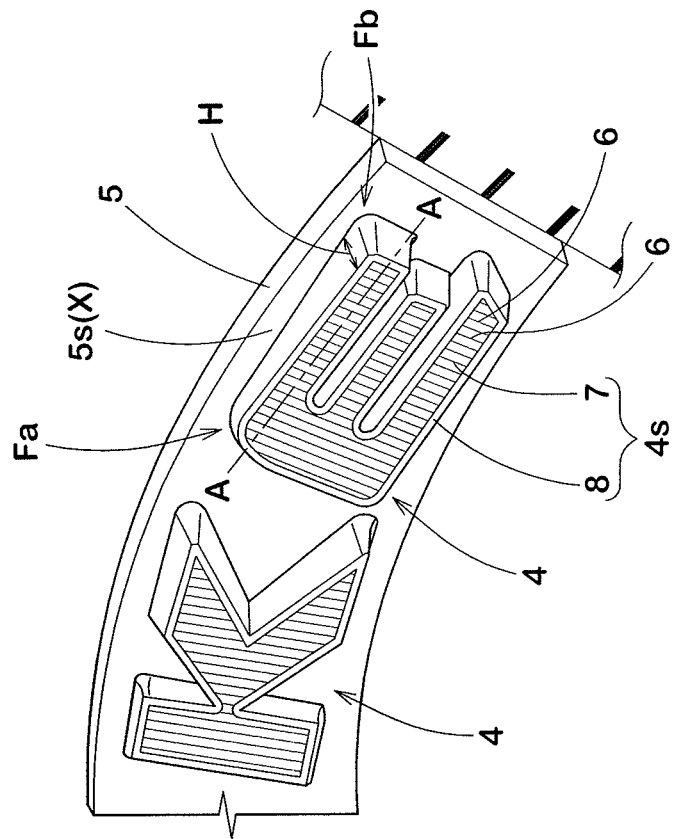
FIG. 2 is an enlarged partial perspective view of marks.
Figure 3A:
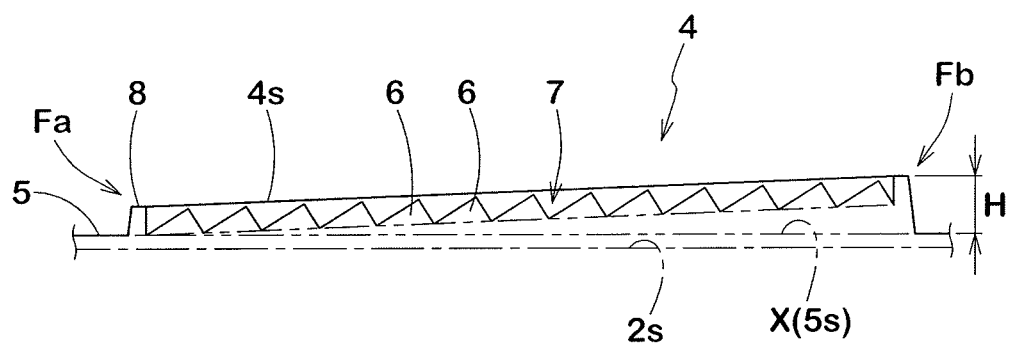
FIG. 3A is a cross-sectional view taken in a tyre circumferential direction of one of the marks.

As shown in FIG. 2, a serration portion 7 in which a plurality of ridges 6 is arranged in parallel is formed on at least a part of a surface (4s) of each of the marks 4. In this embodiment, a case is shown in which the surface (4s) of each of the marks 4 is composed of the serration portion 7 and an edging portion 8. The edging portion 8 extends along an outer circumference of a respective one of the marks 4 to surround the serration portion 7 thereof. As shown in FIG. 3A, it is preferred that the edging portion 8 has a height equal to or larger than that of the serration portion 7. It is possible that the edging portions 8 configured as such make contour shapes of the marks clear, therefore, they are helpful for improving the legibility.

As shown in FIGS. 2 and 3A, a case is shown in this embodiment where the surface (4s) of each of the marks 4 is inclined with respect to the reference surface (x) in a direction in which a height (H) thereof increases from an end (Fa) on one side in a tyre circumferential direction to an end (Fb) on the other side in the tyre circumferential direction. The height (H) means a height from the reference surface (x). By having the surfaces (4s) inclined as such, it is possible that a stereoscopic effect of the marks 4 is emphasized which can contribute to improvement of the legibility.

In this embodiment, a case is shown where each of the ridges 6 extends linearly along a tyre radial direction. However, the ridges 6 may be inclined with respect to the tyre radial direction or may be configured to extend along the tyre circumferential direction.

Figure 3B:
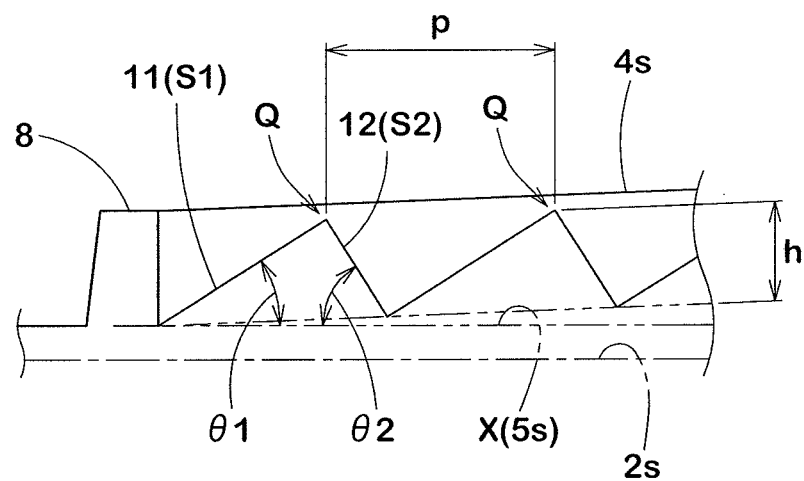
FIG. 3B is an enlarged partial cross-sectional view of ridges.

Next, as shown in FIG. 3B, each of the ridges 6 is configured such that a cross section taken perpendicular to a length direction of a respective one of the ridges 6 has a triangular shape in which a top portion (Q) is sandwiched by a first oblique side 11 and a second oblique side 12, or a trapezoidal shape such that the top portion (Q) is cut off. In this embodiment, a case is shown where the cross section is the triangular shape. Note that a height (h) of each of the ridges 6 and pitches (p) the ridges 6 can be set based on custom. Normally, it is preferred that the height (h) is in the range of from 0.15 to 1.0 mm and the pitch (p) is in the range of from 0.5 to 2.0 times the height (h), In the cross section of each of the ridges 6, an angle θ1 of the first oblique side 11 with respect to the reference surface (x) is different from an angle θ2 of the second oblique side 12 with respect to the reference surface (x). The angles θ1 and θ2 are indicated by angles on a side of an interior angle. In this embodiment, a case is shown in which the angle θ1 is smaller than the angle θ2, that is the first oblique side 11 is mildly sloped as compared with the second oblique side 12.

With such a configuration, an area of an inclined surface (S1) having the first oblique side 11 which is mildly sloped becomes large, therefore, it is possible that the amount of reflected light is increased. Further, it is possible that a difference in light amount is provided between the inclined surface (S1) having the first oblique side 11 and an inclined surface (S2) having the second oblique side 12, therefore, it is possible that a large difference in contrast is brought about between when viewed from one side and when viewed from the other side. And by a synergistic effect of these, it becomes possible that the legibility is improved.

If a difference |θ1−θ2| between the angle θ1 and the angle θ2 is small, the effect described above is not sufficiently exerted. Thereby, the difference |θ1−θ2| is preferably not less than 10 degrees, more preferably not less than 20 degrees, and further preferably not less than 30 degrees. Note that if the angle θ1 or θ2 is more than 90 degrees, undercut occurs, therefore, it is possible that rubber chipping occurs in the ridges when the tyre is removed from a vulcanization mold. Thereby, it is preferred that the angle θ1 or θ2 is not more than 90 degrees.

Note that, as described above, when each of the surfaces (4s) of the marks 4 is inclined in the direction in which the height (H) increases from the end (Fa) on one side to the end (Fb) on the other side in the tyre circumferential direction, it is preferred that the first oblique side 11 which is mildly sloped is arranged on a side of the end (Fa) on one side in the tyre circumferential direction. Thereby, it is possible that the legibility of the marks 4 is further improved by the synergistic effect of the stereoscopic effect of the marks 4 due to the inclination of the surfaces (4s) and increase in the contrast due to the angle difference |θ1−θ2|.

Figure 4A:
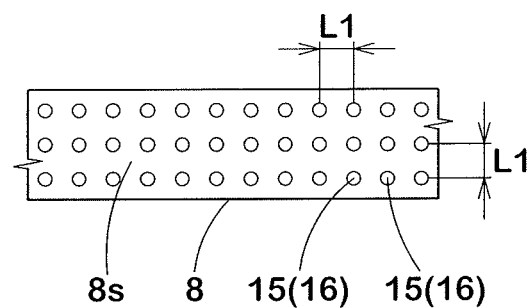
FIG. 4A is a partial plan view showing an arrangement of small protruding portions formed as truncated conical protrusions.
Figure 4B:
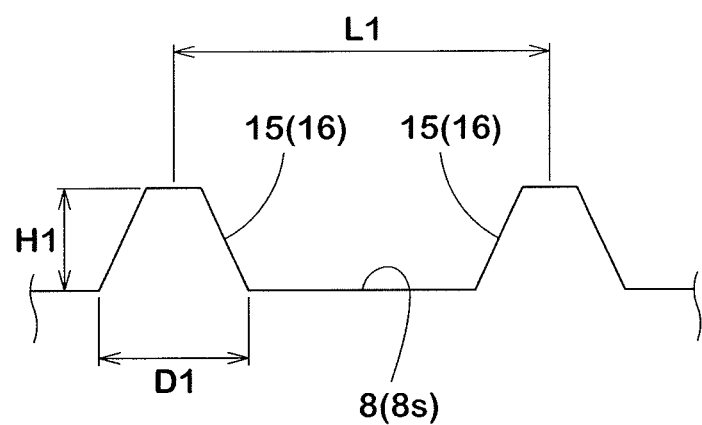
FIG. 4B is a cross-sectional view of the truncated conical protrusions.

Further, as shown in FIGS. 4A and 4B, it is preferred that each of the edging portions 8 is provided with a plurality of small protruding portions 15 each protruding from a surface (8s) of a respective one of the edging portions 8, that is the surface (8s) is a surface of the edging portion other than the small protruding portions. In this embodiment, a case where each of the small protruding portions 15 is a truncated conical protrusion 16 having a smaller diameter on a side of an upper end thereof is shown. It is preferred that each of the truncated conical protrusions 16 has a maximum diameter (D1) in the range of from 50 to 1000 micro meters and a protruding height (H1) from the surface (8s) of a respective one of the edging portions 8 in the range of from 50 to 1000 micro meters, and that a distance (L1) between centers of the small protruding portions 15 adjacent to each other is in the range of from 200 to 1000 micro meters.

It is possible that the truncated conical protrusions 16 configured as such irregularly reflect light and make the surfaces (8s) of the edging portions 8 look black. Thereby, it is possible that the contour shapes of the marks 4 are made clearer, therefore, it is possible that the legibility of the marks 4 is further improved. As a result of research by the present inventor, when the maximum diameter (D1) and the protruding height (H1) of each of the truncated conical protrusions 16, and the distance (L1) of the truncated conical protrusions 16 are outside the above ranges, the edging portions 8 looks whitish due to the reflection of light, therefore, the contrast difference from the serration portions 7 tends to be decreased. Note that by configuring each of the small protruding portions 15 to have a truncated cone shape, it is possible that the reflection of light is further suppressed while the strength is increased as compared with a cylindrical shape.

In this embodiment, a case is shown in which the truncated conical protrusions 16 are arranged in a grid pattern, but they may be arranged in a staggered pattern, or may be randomly arranged as long as the distance (L1) satisfies the above range.

Figure 5A:
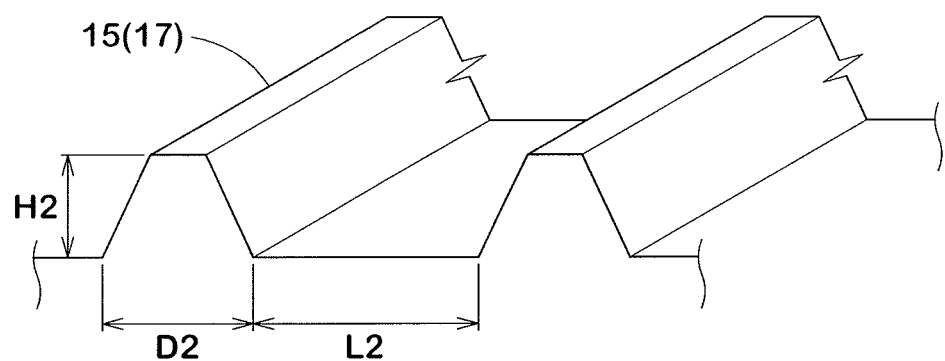
FIG. 5A is a partial perspective view showing an arrangement and cross sections of the small protruding portions formed as rib-shaped protrusions.
Figure 5B:
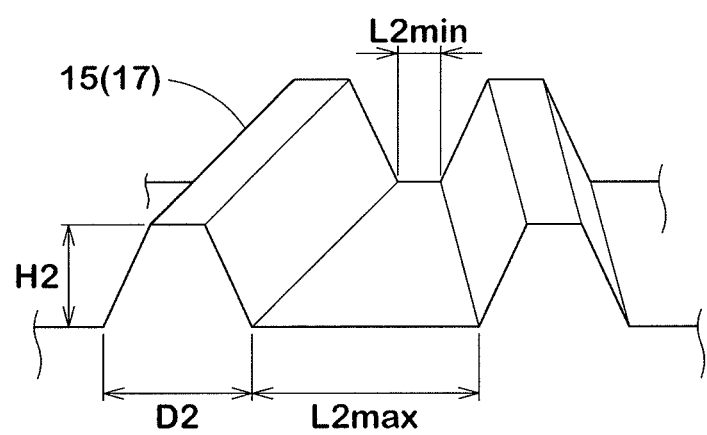
FIG. 5B is a partial perspective view showing another arrangement and the cross sections of the small protruding portions formed as the rib-shaped protrusions.

FIGS. 5A and 5B show another embodiment of the small protruding portions 15. In this embodiment, a case is shown where each of the small protruding portions 15 is a rib-shaped protrusion 17 having a trapezoidal cross section with a thickness thereof decreasing toward an upper end thereof. The rib-shaped protrusions 17 can be arranged parallel to each other as shown in FIG. 5A, or they can be arranged so as not to be parallel to each other (non-parallel) as shown in FIG. 5B. It is preferred that each of the rib-shaped protrusions 17 has a maximum thickness (D2) in the range of from 20 to 1000 micro meters and a protruding height (H2) in the range of from 200 to 500 micro meters, and that a distance (L2) between the rib-shaped protrusions 17 adjacent to each other is in the range of from 10 to 800 micro meters. Note that in a case where the rib-shaped protrusions 17 are arranged in the non-parallel manner, it is preferred that an average value of a maximum value (L2max) and a minimum value (L2min) of the distance (L2) is in the range of from 10 to 800 micro meters.

As is the case with the truncated conical protrusions 16, it is possible that the rib-shaped protrusion 17 irregularly reflect light and make the surfaces (8s) of the edging portions 8 look black. Thereby, it is possible that the contour shapes of the marks 4 are made clearer, therefore, it is possible that the legibility of the marks 4 is further improved. As a result of research by the present inventor, when the maximum thickness (D2) and the protruding height (H2) of each of the rib-shaped protrusions 17, and the distance (L2) of the rib-shaped protrusions 17 are outside the above ranges, the edging portions 8 look whitish due to the reflection of light, therefore, the contrast difference from the serration portions 7 tends to be decreased. Note that, from a point of view of the contrast, it is more preferred that the rib-shaped protrusions 17 are arranged in the non-parallel manner.

Further, in addition to extending straight, each of the ridges 6 may be curved in an arc shape, for example. Furthermore, in each of the mark indicating portions 3, it is possible that the marks 4 are directly formed on the surface (2s) of a respective one of the sidewall portions 2 without having the base portion 5 formed thereon. In this case, the surface (2s) of the sidewall portion 2 forms the reference surface (x). In this case, in order to distinguish the mark indicating portions 3 from other portions, it is preferred that the surface (2s) of each of the sidewall portions 2 is provided with a rib and the like having a small height and surrounding each of the mark indicating portions 3.

While detailed description has been made of the tyre as especially preferred embodiments of the present invention, the present invention can be embodied in various forms without being limited to the illustrated embodiments.

WORKING EXAMPLES (EXAMPLES)

Tyres provided with the marks 4 on the surfaces (2s) of the sidewall portions 2 were made by way of test according to the specifications listed in Table 1, and then the legibility of the marks 4 was compared. The height (h) (0.5 mm) and the pitch (p) (1.2 mm) of the ridges were the same for all of the test tyres.

In Examples 1, 2, and 5 to 7, an inclination angle of the surface (4s) of each of the marks 4 was 7 degrees. Further, in Reference 1 and Example 3 and 4, the height (H) of the surface (4s) of each of the marks 4 from the reference surface (x) was equal to an average value of the heights at the end (Fa) on one side and at the end (Fb) on the other side in the Examples 1, 2, and 5 to 7. In the Examples 1 and 4 to 7, the surfaces of the edging portions were provided with the small protruding portions. In the Examples 1, 4, and 5, the small protruding portions were the truncated conical protrusions each having the maximum diameter (D1) of 320 micro meters and the protruding height (H1) of 500 micro meters, and distance (L1) was 400 micro meters. In the Examples 6 and 7, the small protruding portions were the rib-shaped protrusions each having the maximum thickness (D2) of 160 micro meters and the protruding height (H2) of 200 micro meters, and the distance (L2) was 200 micro meters.

The legibility was evaluated by a visual observation and the evaluation is indicated by an index based on the Reference 1 being 100, wherein a larger numerical value is better.

TABLE 1

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| Angle difference \|θ1-θ2\| of Ridge [degree] | 0 |  |  |  | 50 |  |  |  |
| Inclination of Surface of Mark | Absent | Present |  | Absent |  |  | Present |  |
| Small protruding portions on Surface of Edging portion | Absent | Truncated conical protrusion | Absent | Absent | Truncated conical protrusion | Truncated conical protrusion | Rib-shaped protrusion (parallel) | Rib-shaped protrusion (non-parallel) |
| Legibility | 100 | 115 | 110 | 105 | 110 | 120 | 130 | 135 |

As shown in Table 1, it was confirmed that the tyres as the Examples showed excellent legibility of the marks.

The invention claimed is:

1. A tire comprising a sidewall portion provided with a mark indicating portion having one or more marks, wherein
the mark indicating portion comprises a reference surface provided on a surface of the sidewall portion and the one or more marks formed on the reference surface,
at least a part of a surface of the or each mark is provided with a serration portion in which a plurality of ridges is arranged in parallel,
each of the ridges has a triangular or trapezoidal cross section taken perpendicular to a length direction thereof having a first oblique side and a second oblique side, an angle θ1 of the first oblique side with respect to the reference surface is different from an angle θ2 of the second oblique side with respect to the reference surface, the or each mark is provided with an edging portion extending along an outer circumference of the or each mark to surround the serration portion thereof, the edging portion has a height equal to or larger than that of the serration portion, and the height of the edging portion from the reference surface is larger on one side in the tire circumferential direction than on the other side in the tire circumferential direction.

2. The tire according to claim 1, wherein
a difference |θ1−θ2| between the angle θ1 and the angle θ2 is not less than 10 degrees.

3. The tire according to claim 1, wherein
the edging portion is provided with a plurality of small protruding portions each protruding from a surface of the edging portion.

4. The tire according to claim 3, wherein
each of the small protruding portions is a truncated conical protrusion having a smaller diameter on a side of an upper end thereof.

5. The tire according to claim 4, wherein
each of the truncated conical protrusions has a maximum diameter in a range of from 50 to 1000 micro meters and a protruding height in a range of from 50 to 1000 micro meters, and
a distance between centers of the truncated conical protrusions adjacent to each other is in a range of from 200 to 1000 micro meters.

6. The tire according to claim 1, wherein
the surface of the or each mark is inclined with respect to the reference surface in a direction in which a height thereof increases from one side to the other side in a tire circumferential direction.

7. The tire according to claim 6, wherein
in each of the ridges, a mildly sloped one of the first oblique side and the second oblique side is arranged on the one side in the tire circumferential direction.

8. The tire according to claim 1, wherein the serration portion is not provided with the small protruding portions.

9. A tire comprising a sidewall portion provided with a mark indicating portion having one or more marks, wherein
the mark indicating portion comprises a reference surface provided on a surface of the sidewall portion and the one or more marks formed on the reference surface,
at least a part of a surface of the or each mark is provided with a serration portion in which a plurality of ridges is arranged in parallel,
each of the ridges has a triangular or trapezoidal cross section taken perpendicular to a length direction thereof having a first oblique side and a second oblique side,
an angle θ1 of the first oblique side with respect to the reference surface is different from an angle θ2 of the second oblique side with respect to the reference surface,
a difference |θ1−θ2| between the angle θ1 and the angle θ2 is not less than 10 degrees,
the or each mark is provided with an edging portion extending along an outer circumference of the or each mark to surround the serration portion thereof,
the edging portion has a height equal to or larger than that of the serration portion,
the surface of the or each mark is inclined with respect to the reference surface in a direction in which a height thereof increases from one side to the other side in a tire circumferential direction, and
in each of the ridges, a mildly sloped one of the first oblique side and the second oblique side is arranged on the one side in the tire circumferential direction.

10. The tire according to claim 9, wherein
the edging portion is provided with a plurality of small protruding portions each protruding from a surface of the edging portion.

11. The tire according to claim 10, wherein
each of the small protruding portions is a truncated conical protrusion having a smaller diameter on a side of an upper end thereof.

12. The tire according to claim 11, wherein
each of the truncated conical protrusions has a maximum diameter in a range of from 50 to 1000 micro meters and a protruding height in a range of from 50 to 1000 micro meters, and
a distance between centers of the truncated conical protrusions adjacent to each other is in a range of from 200 to 1000 micro meters.

13. The tire according to claim 9, wherein the serration portion is not provided with the small protruding portions.

14. A tire comprising a sidewall portion provided with a mark indicating portion having one or more marks, wherein
the mark indicating portion comprises a reference surface provided on a surface of the sidewall portion and the one or more marks formed on the reference surface,
at least a part of a surface of the or each mark is provided with a serration portion in which a plurality of ridges is arranged in parallel,
each of the ridges has a triangular or trapezoidal cross section taken perpendicular to a length direction thereof having a first oblique side and a second oblique side,
an angle θ1 of the first oblique side with respect to the reference surface is different from an angle θ2 of the second oblique side with respect to the reference surface,
the surface of the or each mark is inclined with respect to the reference surface in a direction in which a height thereof increases from one side to the other side in a tire circumferential direction, and
an entirety of the or each mark protrudes from the reference surface.

15. The tire according to claim 14, wherein
a difference |θ1−θ2| between the angle θ1 and the angle θ2 is not less than 10 degrees.

16. The tire according to claim 14, wherein
the or each mark is provided with an edging portion extending along an outer circumference of the or each mark to surround the serration portion thereof, and
the edging portion has a height equal to or larger than that of the serration portion.

17. The tire according to claim 14, wherein
the edging portion is provided with a plurality of small protruding portions each protruding from a surface of the edging portion, and
each of the small protruding portions is a truncated conical protrusion having a smaller diameter on a side of an upper end thereof.

18. The tire according to claim 17, wherein
each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

19. The tire according to claim 14, wherein
in each of the ridges, a mildly sloped one of the first oblique side and the second oblique side is arranged on the one side in the tire circumferential direction.

20. The tire according to claim 14, wherein the serration portion is not provided with the small protruding portions.

* * * * *